US011153300B2

(12) United States Patent
Brown et al.

(10) Patent No.: US 11,153,300 B2
(45) Date of Patent: Oct. 19, 2021

(54) SECURE NODE-INITIATED DISCOVERY

(71) Applicant: Dell Products, L.P., Round Rock, TX (US)

(72) Inventors: Michael Emery Brown, Austin, TX (US); Sudhir Vittal Shetty, Cedar Park, TX (US); Pushkala Iyer, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 321 days.

(21) Appl. No.: 16/353,867

(22) Filed: Mar. 14, 2019

(65) Prior Publication Data
US 2020/0296088 A1    Sep. 17, 2020

(51) Int. Cl.
*H04L 29/06* (2006.01)
*H04L 29/08* (2006.01)
*H04L 29/12* (2006.01)
*H04L 9/32* (2006.01)

(52) U.S. Cl.
CPC ...... *H04L 63/0823* (2013.01); *H04L 61/1511* (2013.01); *H04L 67/16* (2013.01); *H04L 9/3213* (2013.01)

(58) Field of Classification Search
CPC .. H04L 63/08; H04L 63/0807; H04L 63/0823
See application file for complete search history.

(56) References Cited

U.S. PATENT DOCUMENTS

2008/0189774 A1 * 8/2008 Ansari ............... H04L 63/20 726/7
2016/0352840 A1 * 12/2016 Negron ............. H04L 67/02

* cited by examiner

*Primary Examiner* — Esther B. Henderson
(74) *Attorney, Agent, or Firm* — Fogarty LLP

(57) ABSTRACT

Embodiments provide secure discovery of a first IHS operating within a plurality of IHSs (Information Handling Systems), such as within a data center, by a remote management tool. The remote management tool is registered with a DNS (Domain Name System). Upon initializing a first IHS, that first IHS is not automatically recognized by the remote management tool. A remote access controller of the first IHS retrieves information from the registration of the remote management tool from the DNS. The remote access controller notifies the remote management tool of the initialized first IHS. The notification is transmitted, by the remote access controller, to a network address specified in the DNS registration information of the remote management tool. The remote management tool confirms the authenticity of the notification provided by the remote access controller and configures the first IHS for remote management.

20 Claims, 3 Drawing Sheets

SECURE NODE-INITIATED DISCOVERY

FIELD

This disclosure relates generally to Information Handling Systems (IHSs), and more specifically, to software resources for managing changes in large groups of IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Groups of IHSs may be utilized within data center environments. A data center may include a large number of IHSs, such as enterprise blade servers that may be stacked and installed within racks. A data center may include large numbers of such server racks that may be organized into rows. Some administration of such data center IHSs may be done locally, but a significant amount of the administration of data center IHSs may be conducted via operations by remote administrators. When new IHSs or reconfigured IHSs are added to a data center, or to another group of managed IHS, these IHSs must be recognized by remote management tools for these IHSs to be remotely administered. In a data center, new and reconfigured IHSs may be regularly added, thus requiring remote management tools to be regularly updated to accurately account for the IHSs being managed.

SUMMARY

In various embodiments, a method is provided for secure discovery of a plurality of IHSs (Information Handling Systems) by a remote management tool. The method includes: registering the remote management tool with a DNS (Domain Name System); initializing a first IHS, wherein the first IHS is not recognized by the remote management tool; retrieving, by a remote access controller of the first IHS, information from the registration of the remote management tool from the DNS; notifying, by the remote access controller, the remote management tool of the initialized first IHS, wherein the notification is transmitted to a network address specified in the DNS registration information of the remote management tool; confirming, by the remote management tool, the authenticity of the notification provided by the remote access controller; and configuring the first IHS for remote management by the remote management tool.

In additional method embodiments, the discovery of the first IHS by the remote management tool does not require any login credentials for requesting access to the first IHS. In additional method embodiments, the registration of the remote management tool with the DNS specifies an address of an IHS discovery service supported by the remote management tool. In additional method embodiments, the notification by the remote access controller may be transmitted to the network address of the IHS discovery service. In additional method embodiments, the remote access controller comprises a secure memory storing a security certificate signed by an entity trusted by the remote management tool. In additional method embodiments, the security certificate is used by the remote access controller to sign communications that are transmitted to the IHS discovery service and used by the IHS discovery service in the confirmation of the authenticity of the notification provided by the remote access controller. In additional method embodiments, credentials from the security certificate are provided to the remote management tool upon a notification of the initialization of the first IHS by a mobile application used to scan a code attached to the first IHS.

In various additional embodiments, a system is provided for secure discovery of a plurality of IHSs (Information Handling Systems) by a remote management tool. The system includes the remote management tool that is configured to: register the remote management tool with a DNS (Domain Name System); receive, via an address provided in the DNS registration, a notification of a first IHS of the plurality of IHSs, wherein the first IHS is not recognized by the remote management tool; confirm the authenticity of the notification provided by the remote access controller; and configure the first IHS for remote management by the remote management tool. The system also includes the first IHS, wherein the IHS comprises a remote access controller configured to: retrieve information from the registration of the remote management tool from the DNS; and notify the remote management tool of the initialized first IHS, wherein the notification is transmitted to a network address specified in the DNS registration information of the remote management tool.

In additional system embodiments, the discovery of the first IHS by the remote management tool does not require any login credentials for requesting access to the first IHS. In additional system embodiments, the registration of the remote management tool with the DNS specifies an address of an IHS discovery service supported by the remote management tool. In additional system embodiments, the notification by the remote access controller may be transmitted to the network address of the IHS discovery service. In additional system embodiments, the remote access controller comprises a secure memory storing a security certificate signed by an entity trusted by the remote management tool. In additional system embodiments, the security certificate is used by the remote access controller to sign communications that are transmitted to the IHS discovery service and used by the IHS discovery service in the confirmation of the authenticity of the notification provided by the remote access controller. In additional system embodiments, credentials from the security certificate are provided to the remote management tool upon a notification of the initialization of the first IHS by a mobile application used to scan a code attached to the first IHS.

In various additional embodiments, an IHS (Information Handling System) operating within a network of IHSs. The IHS includes: one or more processors operable to execute instructions for running software applications that support remote management via a remote management tool and a plurality of hardware components that are remotely managed by the remote management tool. The IHS also includes a remote access controller configured to initiate discovery of the IHS by the remote management tool, wherein the remote access controller is configured to: retrieve information from a registration of the remote management tool from a DNS (Domain Name System); and notify the remote management tool of the initialized first IHS, wherein the notification is transmitted to a network address specified in the retrieved DNS registration information of the remote management tool, wherein the notification is used by the remote management tool to confirm the authenticity of the notification provided by the remote access controller; and wherein the remote access tool configures the first IHS for remote management.

In additional IHS embodiments, the discovery of the first IHS by the remote management tool does not require any login credentials for requesting access to the first IHS. In additional IHS embodiments, the registration of the remote management tool with the DNS specifies an address of an IHS discovery service supported by the remote management tool. In additional IHS embodiments, the notification by the remote access controller may be transmitted to the network address of the IHS discovery service. In additional IHS embodiments, the remote access controller comprises a secure memory storing a security certificate signed by an entity trusted by the remote management tool. In additional IHS embodiments, the security certificate is used by the remote access controller to sign communications that are transmitted to the IHS discovery service and used by the IHS discovery service in the confirmation of the authenticity of the notification provided by the remote access controller.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
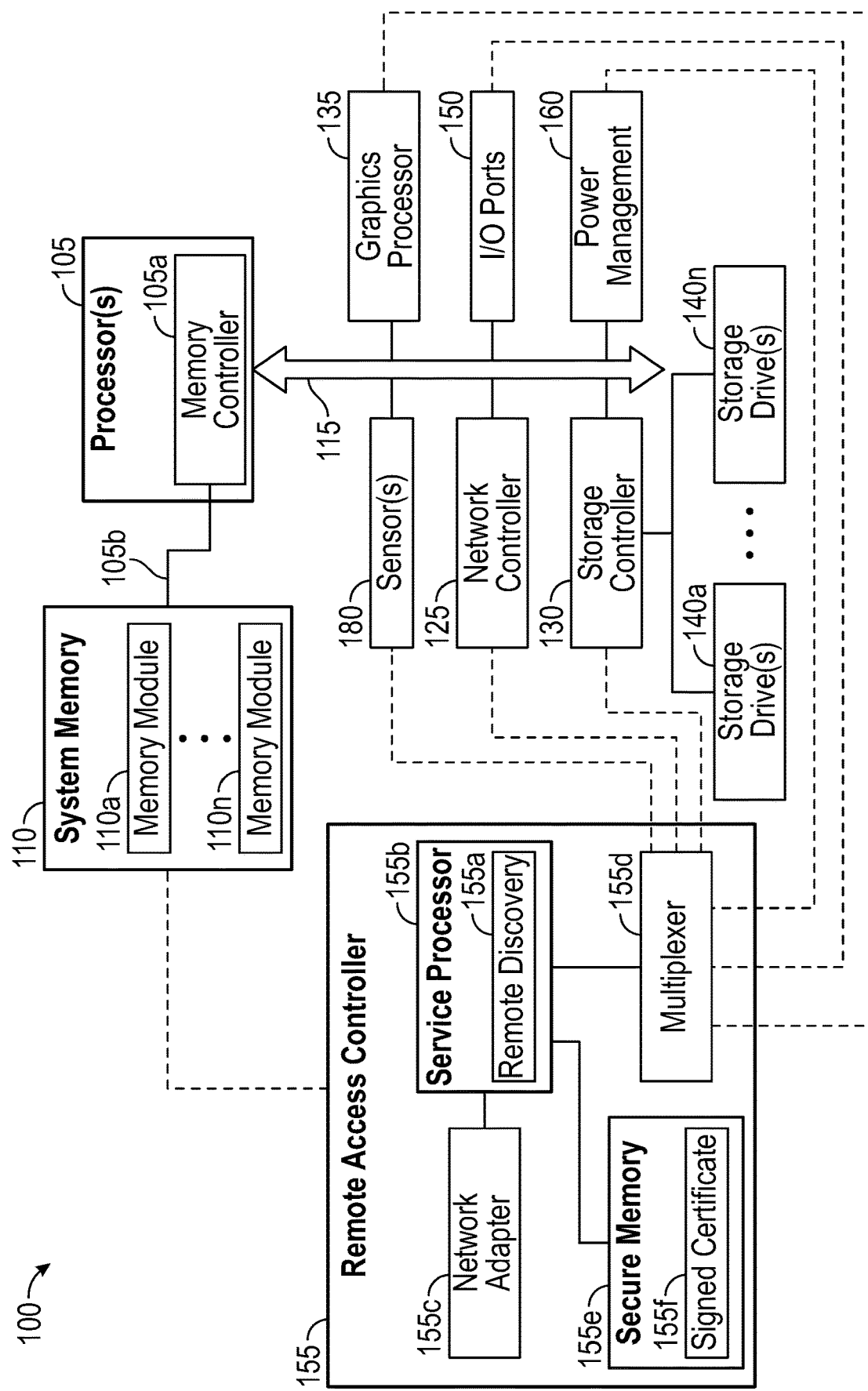
FIG. 1 is a block diagram depicting certain components of an IHS configured according to various embodiments for initiating procedures for discovery of the IHS by a remote management system.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of an enterprise computing device, other embodiments may be utilized.

As described, IHSs may be formed into large networks of managed IHSs within a data center. Effectively managing such large groups of IHSs may be accomplished using software tools that allow administrators to remotely manage the IHSs individually and as members of groups of similarly configured IHSs. As described, new or reconfigured IHSs may be regularly added to a group of managed IHSs, such as in a data center. Those new IHSs cannot be remotely managed until they are recognized by the remote management tools in use. Existing techniques for detecting such additions require periodically scanning a data center network to identify any new IHSs that have been added to the data center. Such network scans allow the remote management tools to locate a new IHS, but in order to begin administering the new IHS, the correct credentials for gaining access to the new IHS must be presented.

In scenarios where groups of new IHSs are being added at once, presenting the correct credentials for each IHS in the group can be error-prone and time consuming. Each of the new IHSs may be manually configured to use the same credentials, but this is also a time consuming and error-prone process. Accordingly, embodiments provide techniques by which a new and/or reconfigured IHS being added to a managed network may initiate discovery of the IHS by the remote management tool, while not creating a security vulnerability for the remote management tool.

FIG. 1 is a block diagram illustrating certain components of an IHS 100 configured according to certain embodiments to implement systems and methods described herein, in particular for initiating procedures for discovery of the IHS 100 by a remote management system. In certain data center embodiments, a rack-mounted chassis may include one or more bays that each receive an individual sled (that may be additionally or alternatively referred to as a tray, blade, and/or node), such as compute sleds that provides processing resources and storage sleds that provide storage resources. In certain embodiments, IHS 100 may be a compute sled installed within rack-mounted chassis that is housed within a data center. Such compute sleds may be regularly replaced with new, repaired and/or repurposed compute sleds. Each time a compute sled is added in this manner, the compute sled must be recognized by remote management tools in order for the compute sled to be remotely managed. As described in additional detail with regard to FIGS. 2 and 3, a managed IHS 100, such as a compute sled, may be configured to initiate discovery of the IHS 100 by the remote management tools.

In embodiments where IHS 100 is a compute sled installed within a chassis that is stacked within a rack along with other chassis that also include various sleds, IHS 100 may utilize certain shared power, network and cooling resources provided by the chassis and/or rack. In certain embodiments, various aspects of such shared capabilities by IHS 100 may be configurable. Although the embodiment of FIG. 1 describes an IHS in the form of a compute sled or other computing component that may be deployed within a bay of a rack-mounted chassis, other embodiments may be implemented using other types of IHSs.

In certain embodiments, IHS 100 may utilize one or more processors 105. In some embodiments, processors 105 may include a main processor and a co-processor, each of which may include a plurality of processing cores that, in certain scenarios, may each be used to run an instance of a server process. In certain embodiments, one or all of processor(s) 105 may be graphics processing units (GPUs) in scenarios where IHS 100 has been configured to support functions such as multimedia services and graphics applications. As illustrated, processor(s) 105 includes an integrated memory controller 105a that may be implemented directly within the circuitry of the processor 105, or the memory controller 105a may be a separate integrated circuit that is located on the same die as the processor 105.

The memory controller 105a may be configured to manage the transfer of data to and from the system memory 110 of the IHS 100 via a high-speed memory interface 105b. The system memory 110 may be coupled to processor(s) 105 via a memory bus 105b that provides the processor(s) 105 with high-speed memory used in the execution of computer program instructions by the processor(s) 105. Accordingly, system memory 110 may include memory components, such as such as static RAM (SRAM), dynamic RAM (DRAM), NAND Flash memory, suitable for supporting high-speed memory operations by the processor(s) 105. In certain embodiments, system memory 110 may combine both persistent, non-volatile memory and volatile memory.

In certain embodiments, the system memory 110 may be comprised of multiple removable memory modules. The system memory 110 of the illustrated embodiment includes removable memory modules 110a-n. Each of the removable memory modules 110a-n may correspond to a printed circuit board memory socket that receives a removable memory module 110a-n, such as a DIMM (Dual In-line Memory Module), that can be coupled to the socket and then decoupled from the socket as needed, such as to upgrade memory capabilities or to replace faulty components. Other embodiments of IHS system memory 110 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 100 may utilize a chipset that may be implemented by integrated circuits that are connected to each processor 105. All or portions of the chipset may be implemented directly within the integrated circuitry of an individual processor 105. The chipset may provide the processor(s) 105 with access to a variety of resources accessible via one or more buses 115. Various embodiments may utilize any number of buses to provide the illustrated pathways served by bus 115. In certain embodiments, bus 115 may include a PCIe (PCI Express) switch fabric that is accessed via a PCIe root complex. In various embodiments, the resources available via buses 115 may include various hardware components, such as those illustrated in FIG. 1, that support remote management. As illustrated, certain of the managed hardware devices of IHS 100 may be accessible by a remote access controller 155 via sideband signaling pathways that operate independent of the operating system of IHS 100. In certain embodiments, the managed components may be additionally or alternatively accessed by the remote access controller 155 via the operating system of the IHS 100.

IHS 100 may also include one or more I/O ports 150, such as PCIe ports, that may be used to couple the IHS 100 directly to other IHSs, storage resources or other peripheral components. The I/O ports 150 may support temporary and permanent couplings of hardware devices to IHS 100. In various embodiments, any of the components coupled to I/O ports 150 may be managed remotely by operations of the remote access controller 155. Another resource of IHS 100 that may be accessed by processor(s) 105 is a network controller 125, such as provided by a Network Interface Controller (NIC) that is coupled to the IHS 100 and that allows the IHS 100 to communicate via an external network, such as the Internet or a LAN. Processor(s) 105 may also be coupled to a power management unit 160 that may interface with a power system of a chassis in which an IHS 100 may be installed as a compute sled.

In certain embodiments, a graphics processor 135 may be comprised within one or more video or graphics cards, or an embedded controller, installed as components of the IHS 100. In certain embodiments, graphics processor 135 may be an integrated in the remote access controller 155 and may be utilized to support the display of diagnostic and administrative interfaces related to IHS 100, via display devices that are coupled, either directly or remotely, to remote access controller 155.

In certain embodiments, the remote access controller 155 and/or the operating system of IHS 100 may utilize information collected by various sensors 180 located within the IHS. For instance, temperature data collected by sensors 180 may be utilized by the remote access controller 155 in support of closed-loop airflow cooling of the IHS 100. Various other types of environmental sensors may be utilized by IHS 100. In certain embodiments, sensors 180 may be used to detect any attempts to access the internal hardware of IHS 100, thus detecting any unauthorized tampering with IHS 100.

In certain embodiments, IHS 100 may operate using a BIOS (Basic Input/Output System) that may be stored in a non-volatile memory accessible by the processor(s) 105. The BIOS may provide an abstraction layer by which the operating system of the IHS 100 interfaces with the hardware components of the IHS. Upon powering or restarting IHS 100, processor(s) 105 may utilize BIOS instructions to initialize and test hardware components coupled to the IHS, including both components permanently installed as components of the motherboard of IHS 100 and removable components installed within various expansion slots supported by the IHS 100. The BIOS instructions may also load an operating system for use by the IHS 100. In certain embodiments, IHS 100 may utilize Unified Extensible Firmware Interface (UEFI) in addition to or instead of a BIOS. In certain embodiments, the functions provided by a BIOS may be implemented, in full or in part, by the remote access controller 155.

In certain embodiments, remote access controller 155 may operate from a different power plane from the processors 105 and other components of IHS 100, thus allowing the remote access controller 155 to operate, and management tasks to proceed, while the processing cores of IHS 100 are powered off. As described, various functions provided by the BIOS, including launching the operating system of the IHS 100, may be implemented by the remote access controller 155. In some embodiments, the remote access controller 155 may perform various functions to verify the integrity of the IHS 100 and its hardware components prior to initialization of the IHS 100 (i.e., in a bare-metal state).

As illustrated, remote access controller 155 may include a service processor 155a, or specialized microcontroller, that operates management software that supports remote monitoring and administration of IHS 100. Remote access controller 155 may be installed on the motherboard of IHS 100 or may be coupled to IHS 100 via an expansion slot provided by the motherboard. In support of remote monitoring functions, network adapter 125c may support connections with remote access controller 155 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality used by information technology (IT) administrators to deploy, update, monitor, and maintain servers remotely.

In some embodiments, remote access controller 155 may support monitoring and administration of various managed devices 110, 125, 130, 135, 150, 160, 180 of an IHS via a sideband bus interface. For instance, messages utilized in detection, interrogation and management of unrecognized hardware components may be transmitted using I2C sideband bus connections that may be established with each of the respective managed devices 110, 125, 130, 135, 150, 160, 180 through the operation of a multiplexer 155d of the remote access controller 155. As illustrated, the managed devices 110, 125, 130, 135, 150, 160, 180 of IHS 100 may also be coupled to the IHS processor(s) 105 via an in-line bus 115, such as a PCIe root complex, that is separate from the sideband bus connections used for device management. In certain embodiments, the remote access controller 155 may establish such in-line bus 115 connections via the operating system of the IHS 100. In such embodiments, remote access controller 155 may query the operating system of IHS 100 via the processor 105 or chipset of the IHS.

As illustrated, in certain embodiments, the remote access controller 155 may include a secure storage 155e that may be implemented via a memory device that is isolated from the operating system of IHS 100. As described, an IHS 100, such as a server blade or compute node, may be installed within a rack or chassis within a data center environment. As described in additional detail with regard to FIGS. 2 and 3, in scenarios where IHS 100 is a newly installed member of a managed group of IHS, such as within a data center, the remote access controller 155 of the new IHS 100 may initiate discovery of the IHS 100 by the remote management tools utilized by the data center.

In order to authenticate communications of the remote access controller 155 that initiate discovery of the IHS 100, the secure storage 155e may be provisioned with a signed certificate 155f. The signed certificate 155f may be signed by an authority that is trusted by the remote management system, thus providing a mechanisms for the remote management system to authenticate the IHS 100 as a legitimate system that has been configured for remote management. In certain embodiments, the signed certificate 155f may be provisioned in the secure storage of the remote access controller during manufacture of IHS 100. Embodiments may support replacement of the signed certificate 155f after the IHS 100 has been deployed. In such cases where a signed certificate 155f is replaced, the remote access controller 155 may be configured to re-initiate discovery of the IHS 100 by the remote management system in the same manner as if the IHS 100 was a newly installed component.

As described, the remote access controller 155 may operate from a different power plane from the operating system of IHS 100 and may support management of various managed devices 110, 125, 130, 135, 150, 160, 180 via sideband signaling pathways the operate independent of the operating system. Accordingly, in certain embodiments, the remote access controller 155 may support configuring remote management of IHS 100 and also of the managed devices 110, 125, 130, 135, 150, 160, 180 while the operating system of IHS 100 has not been initialized. In addition, the integrity of these managed components may be confirmed by the remote management controller 155 prior to configuring the remote management of these components. In certain embodiments, remote management controller 155 may be configured to signal an alert condition if a component is detected operating on IHS 100 and that component cannot be configured for remote management due to inability to verity the integrity of the component, thus providing additional security against compromised components operating undetected on IHS 100.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip.

Figure 2:
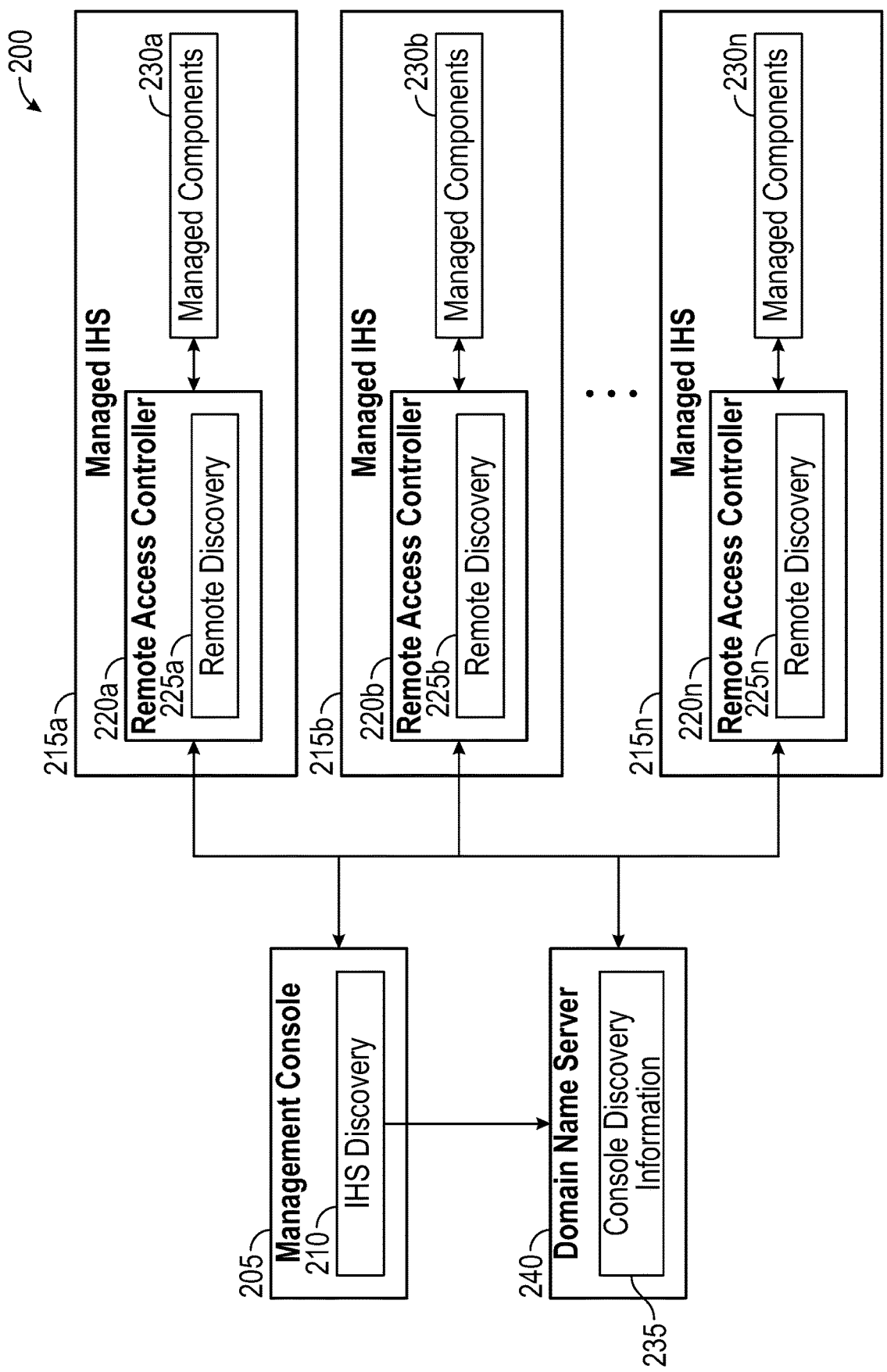
FIG. 2 is a block diagram depicting certain components of a system configured according to various embodiments with a remote management system that supports a plurality of IHSs initiating procedures for discovery by the remote management system.

FIG. 2 is a block diagram depicting certain components of a system 200 that may be configured for remote management that supports a plurality of IHSs 215a-n that initiate procedures for discovery by the remote management system. As described with regard to FIG. 1, a managed IHS, such a blade server utilized within a data center, may include a remote access controller 220a-n by which various aspects of managed IHSs 215a-n may be remotely monitored and administered. Also as described, remote access controller 220a-n may provide management of a managed IHS 215a-n that includes monitoring and administration of one or more managed components 230b that may include hardware and/or software components of the managed IHS 215a-n.

In certain embodiments, the remote access controllers 220a-n of managed IHS 215a-n may communicate with an IHS discovery 210 process of a remote management console 205 in supporting the discovery of the managed IHSs 215a-n. As described, the operations of remote access controllers 220a-n may be external to the operating system of a managed IHS 215a-n, thus allowing the discovery of a managed IHS 215a-n without the operating system of the managed IHS 215a-n. In certain embodiments, the remote access controllers 220a-n may support the described discovery of a managed IHS 215a-n without booting the operating system of the managed IHS 215a-n.

In support of discovery initiated by the managed IHSs 215a-n, the remote management console 205 may be registered with a DNS (Domain Name System) 240, which may be comprised of one or more DNS servers supported by a data center in which the managed IHSs 215a-n are located and may include DNS servers that are external to the data center. In certain embodiments, the registration of the remote management console 205 with the DNS 240 may include address information for an IHS discovery 210 capability supported by the remote console 205. In certain embodiments, console discovery information 235 may be maintained on the DNS 240 as DNS records associated with the DNS registration of the remote console 205. As described in additional detail with regard to FIG. 3, the console discovery information 235 may include a network address for an IHS discovery 210 process that is supported by the management console 205. Using this network address, the remote access controller 220a may notify the HIS discovery 210 process of the activation of the managed IHS 215a.

As reflected in FIG. 2, each remote access controller 220a-n may include a capability that initiates remote discovery 225a-n of the managed IHS 215a-n by the remote management console 205. In certain embodiments, the remote discovery 225a-n capability may be implemented via the firmware or other instructions utilized by the remote access controller. The remote discovery 225a-n capability may also be a program that operates within a secure execution environment operated by the remote access controller 220a-n. In certain embodiments, upon initializing the remote access controller 220a of a managed IHS 215a, the remote discovery 225a capability may trigger registration of the managed IHS 215a with the DNS 240. Once registered with DNS 240, the remote access controller 220a may obtain the console discovery information 235 associated with the DNS registration of the management console 205 that is to be used to remotely administer the managed IHS 215a.

As described, in a data center, new and reconfigured IHSs may be regularly added to the IHSs managed by the remote management console 205. Via the notification provided to the management console 205 by the remote access controller 220a, the managed IHS 215a initiates procedures for the discovery of the managed IHS 215a. By initiating its discovery by the remote management console 205, the managed IHS 215a obviates the need for the remote management console 205 to detect new IHSs via exhaustive scanning of the network of managed IHSs in order to identify any unrecognized IHSs. As described, such scanning procedures can be costly to implement and, once an unrecognized IHS is detected by such scanning, completing the discovery process commonly requires providing login credentials in order to gain access to the newly discovered IHS and to configure the new IHS for remote management.

Although initiation of the discovery by the IHS being added serves to free the remote console 205 from having to scan the managed network for new IHSs, it also introduces a potential security vulnerability with regard to ensuring that the notifications received by the remote console 205 are authentic. As described, a remote access controller 220a of a managed IHS 215s may include a secure storage device. In certain embodiments, the secure storage of the remote access controller 220a may be used to store a public key certificate signed by an authority trusted by the remote management console 205. In certain embodiments, the public key certificate may be provisioned in the secure memory of the remote access controller 220a during manufacture of a managed IHS 215a. During the discovery handshake, the remote access controller 220 may utilized the certificate in order to generate self-signed communications that can be authenticated by the IHS discovery 210 process of the remote management console, thus ensuring that the described IHS discovery process is limited to legitimate IHSs.

Figure 3:
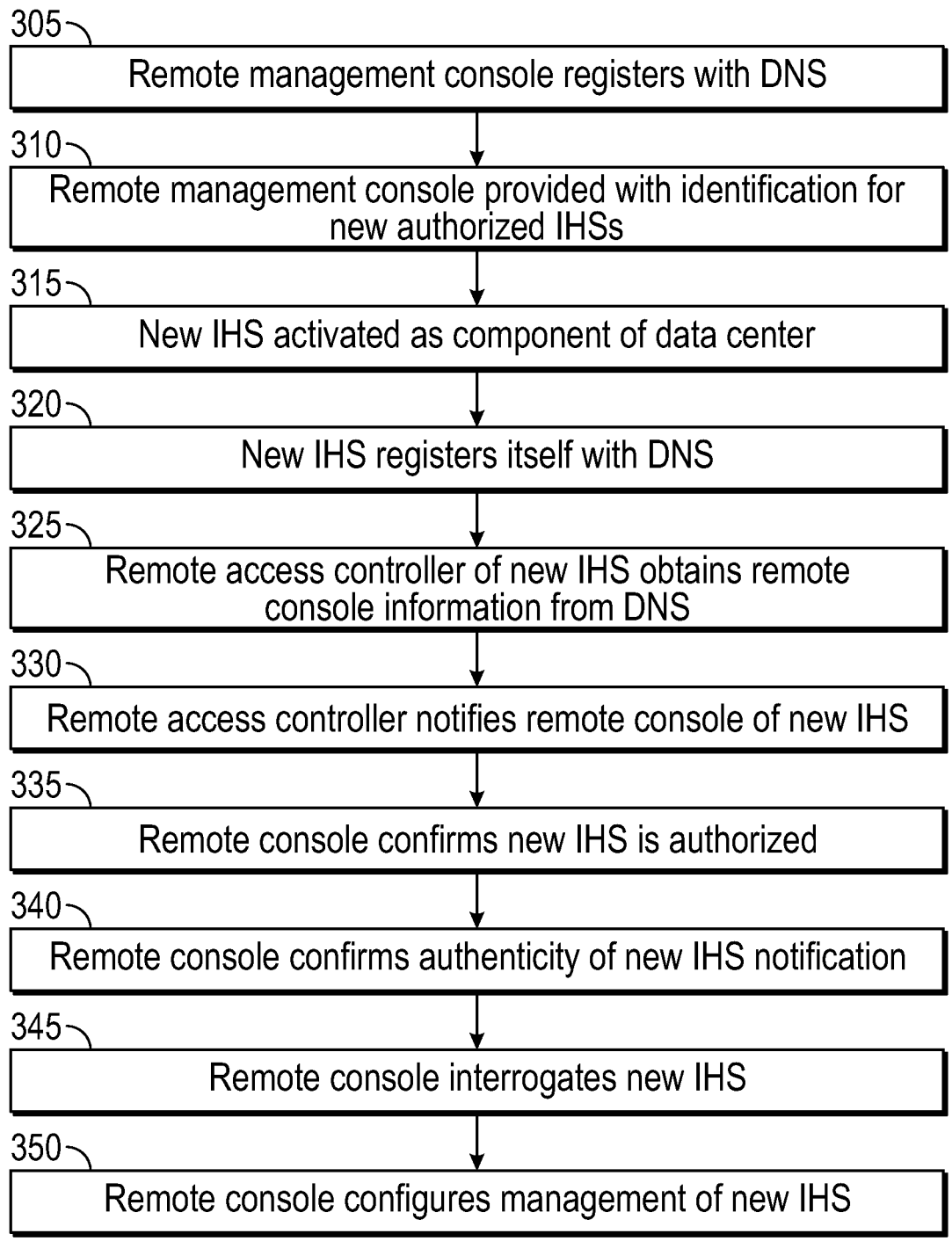
FIG. 3 is a flow chart illustrating certain steps of a process according to certain embodiments for an IHS to initiate procedures for discovery of the IHS by a remote management system.

FIG. 3 illustrates certain steps of a process according to certain embodiments for an IHS to initiate procedures for discovery of the IHS by a remote management system. The illustrated embodiment begins at block 305 with the remote management console registering with a DNS server. In various scenarios, the DNS server may be a public server or a private server for use within a data center or other managed group of IHSs. As described, the registration of a remote management console with DNS may include the creation of DNS records on a DNS server, where these records serve to identify the remote management console. In particular, in registering with DNS, the remote management console may create SRV, PTR and/or TXT DNS records that are stored on the DNS server. In combination, such records serve to identify an address for communicating with the remote management console, the protocol used for communicating with the remote management console and the address of a the IHS discovery service supported by the remote management console.

Once the remote management console has been registered with DNS, at block 310, the remote management console may be provided with information identifying new managed IHSs, such as new compute sleds, blade servers rather managed components of the data center. In certain embodiments, this information may be provided upon completion of the installation of a new or reconfigured IHS. For instance, administrators conducting the manual installation of the managed IHS may be provided with a mobile device application that can be used to scan a service tag that is encoded by a bar code, QR (Quick Response) code or other code that may be affixed to the IHS and uniquely identifies that IHS. The mobile device application may forward a notification identifying the newly installed IHS to the remote console. In certain embodiments, the notification may specify a service tag of the newly installed IHS and may also include security credentials associated with the newly installed HIS. In certain embodiments, the security credentials of the installed IHS may be retrieved via a secure transaction from a protected source by the remote management console. In certain embodiments, administrators may manually record a service tag or other identifier and may provide this information to the remote management console via various other means.

At block 315, the newly installed IHS may be initialized. In various embodiments, the newly installed HIS may be initialized prior at prior to its occurrence in the embodiment of FIG. 3. In certain embodiments, the initialization of block 315 may boot the operating system of the IHS. Alternatively or additionally, the initialization may boot the remote access controller of the IHS. As described, discovery of the newly installed IHS may be conducted by the remote access controller without accessing the operating system. Upon initialization, at block 320, the remote access controller of the newly installed IHS may register the network address information of the newly installed IHS with a DNS. In some embodiments, the remote access controller may register with the same DNS server as the DNS server used for registration by the remote management console. Other embodiments may rely on the capability for DNS registrations to be propagated between DNS servers such that the newly installed IHS may register with a different DNS server than used by the remote management console.

With the newly installed IHS registered with DNS, at block 325, the remote access controller may query the DNS for network address information for the remote management console. As described, In certain embodiments, the network address information of the remote management console that has been registered with DNS may include several records, such as PTR, SRV and/or TXT DNS records that provide additional information regarding the network address by which the remote management console receives communications. Upon request, such DNS records regarding the remote management console may be provided to the remote access controller. In certain embodiments, the DNS records may specify a network address, such as an IP address and port number, of an HIS discovery service supported by the remote management console.

At block 330, the remote access controller may utilize the information provided in the DNS records to notify the remote management console of the newly installed IHS. For instance, the remote access controller may utilize an API supported by the IHS discovery service of the remote management console in order to submit a notification of the newly installed IHS. In such notifications submitted to the IHS discovery service, the remote access controller may specify the service tag or other unique identifier of the newly installed IHS. In certain embodiments, the notification may also specify the IP address of the new IHS. As described, initiation of discovery by the installed IHS prevents the need for exhaustive scans by the remote management console for newly installed IHSs. However, the notifications received by the remote management console from newly installed IHSs require authentication in order to prevent malicious actors from misuse of the described notification procedures. Accordingly, in certain embodiments, the notification may include a certificate that may be authenticated using the credentials provided to or retrieved by the remote management console at block 310.

Based on the information provided in the notification from the remote access controller of the new IHS, at block 335, the IHS discovery process may confirm the new IHS has been assigned to the remote management console. For instance, the notification provided to the IHS discovery service may include a service tag or other unique identifier for new IHS. The IHS discovery process may confirm the service tag provided in the notification matches a service tag received, at block 310, by the remote management console. As described, the notification provided to the remote management console at block 310 may also include, or be used to obtain, security credentials associated with a new or reconfigured IHS, such as a public key of the IHS, where the key may be signed by an authority trusted by the remote management console.

At block 340, the IHS discovery process of the remote management console may utilize the security credentials received at block 310 in order to verify the authenticity of the notification received from the remote access controller. In particular, based on the service tag reported by the remote access controller, the remote management console may identify an associated public key received at block 310. If this public key confirms the authenticity of the signed certificate included in the notification received from the remote access controller, the authenticity of the discovery request is confirmed. In certain embodiments, a TLS handshake may be utilized to confirm the authenticity of the security credentials maintained by the remote access controller. In this manner, the IHS discovery process may ensure that the discovery notifications initiated by the remote access controller of the new IHS are legitimate.

If the authenticity of the notification is confirmed, at block 345, the remote management console may begin interrogation of the remote access controller of the new IHS. For instance, the remote management console may establish a secure communication channel, between the remote management console and the remote access controller of the new IHS. In certain embodiments, the secure channel may be established via the TLS handshake by which the authenticity of the remote access controller is determined. Upon configuring this secure communication channel, at block 350, the remote management console may configure the remote access controller of the new IHS for remote management. In this manner, the an IHS may be added to a data center network and be configured for remote management, without a remote management application or individual having to provide security credentials to gain access to the new IHS. Instead, a secure communication channel may be established by a remote access controller of the new IHS initiating a discovery notification to a discovery service that is supported by the remote management tool, where this discovery service is protected via a required agreement of credentials that may be rooted to the manufacture of the IHS. IHSs may thus be securely added to a data center environment, without having to manually configure each IHS for remote management and without having to provide any credentials for this configuration of remote management.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for secure discovery of a plurality of IHSs (Information Handling Systems) by a remote management tool, the method comprising:
registering the remote management tool with a DNS (Domain Name System);
initializing a first IHS (Information Handling System), wherein the first IHS is not recognized by the remote management tool;
retrieving, by a remote access controller of the first IHS, information from the registration of the remote management tool from the DNS;
notifying, by the remote access controller, the remote management tool of the initialized first IHS, wherein the notification is transmitted to a network address specified in the DNS registration information of the remote management tool;
confirming, by the remote management tool, the authenticity of the notification provided by the remote access controller; and
configuring the first IHS for remote management by the remote management tool.

2. The method of claim 1, wherein the discovery of the first IHS by the remote management tool does not require any login credentials for requesting access to the first IHS.

3. The method of claim 1, wherein the registration of the remote management tool with the DNS specifies an address of an IHS discovery service supported by the remote management tool.

4. The method of claim 3, wherein the notification by the remote access controller may be transmitted to the network address of the IHS discovery service.

5. The method of claim 1, wherein the remote access controller comprises a secure memory storing a security certificate signed by an entity trusted by the remote management tool.

6. The method of claim 5, wherein the security certificate is used by the remote access controller to sign communications that are transmitted to the IHS discovery service and used by the IHS discovery service in the confirmation of the authenticity of the notification provided by the remote access controller.

7. The method of claim 6, wherein credentials from the security certificate are provided to the remote management tool upon a notification of the initialization of the first IHS by a mobile application used to scan a code attached to the first IHS.

8. A system comprising a management IHS (Information Handling System) and a plurality of IHS, wherein the management IHS operates a remote management tool for secure discovery of the plurality of IHSs (Information Handling Systems), the system comprising:
the remote management tool configured to:
register the remote management tool with a DNS (Domain Name System); and
receive, via an address provided in the DNS registration, a notification of a first IHS of the plurality of IHSs, wherein the first IHS is not recognized by the remote management tool;
confirm the authenticity of the notification provided by the remote access controller; and
configure the first IHS for remote management by the remote management tool; and
the first IHS, wherein the IHS comprises a remote access controller configured to:
retrieve information from the registration of the remote management tool from the DNS; and
notify the remote management tool of the initialized first IHS, wherein the notification is transmitted to a network address specified in the DNS registration information of the remote management tool.

9. The system of claim 8, wherein the discovery of the first IHS by the remote management tool does not require any login credentials for requesting access to the first IHS.

10. The system of claim 8, wherein the registration of the remote management tool with the DNS specifies an address of an IHS discovery service supported by the remote management tool.

11. The system of claim 10, wherein the notification by the remote access controller may be transmitted to the network address of the IHS discovery service.

12. The system of claim 8, wherein the remote access controller comprises a secure memory storing a security certificate signed by an entity trusted by the remote management tool.

13. The system of claim 12, wherein the security certificate is used by the remote access controller to sign communications that are transmitted to the IHS discovery service and used by the IHS discovery service in the confirmation of the authenticity of the notification provided by the remote access controller.

14. The system of claim 13, wherein credentials from the security certificate are provided to the remote management tool upon a notification of the initialization of the first IHS by a mobile application used to scan a code attached to the first IHS.

15. An IHS (Information Handling System) operating within a network of IHSs (Information Handling Systems), wherein the IHS comprises:
one or more processors operable to execute instructions for running software applications that support remote management via a remote management tool;
a plurality of hardware components that are remotely managed by the remote management tool;
a remote access controller configured to initiate discovery of the IHS by the remote management tool, wherein the remote access controller is configured to:
retrieve information from a registration of the remote management tool from a DNS (Domain Name System); and
notify the remote management tool of the initialized first IHS, wherein the notification is transmitted to a network address specified in the retrieved DNS registration information of the remote management tool, wherein the notification is used by the remote management tool to confirm the authenticity of the notification provided by the remote access controller; and
wherein the remote access tool configures the first IHS for remote management.

16. The IHS of claim 15, wherein the discovery of the first IHS by the remote management tool does not require any login credentials for requesting access to the first IHS.

17. The IHS of claim 15, wherein the registration of the remote management tool with the DNS specifies an address of an IHS discovery service supported by the remote management tool.

18. The IHS of claim 17, wherein the notification by the remote access controller may be transmitted to the network address of the IHS discovery service.

19. The IHS of claim 15, wherein the remote access controller comprises a secure memory storing a security certificate signed by an entity trusted by the remote management tool.

20. The IHS of claim 19, wherein the security certificate is used by the remote access controller to sign communications that are transmitted to the IHS discovery service and used by the IHS discovery service in the confirmation of the authenticity of the notification provided by the remote access controller.

* * * * *